Oct. 19, 1954  A. F. WHITNEY  2,692,147
ANTIJACKKNIFE ATTACHMENT FOR SEMITRAILER TRUCKS
Filed March 22, 1951

INVENTOR.
ASA F. WHITNEY
BY
*H. G. Burns*
ATTORNEY

Patented Oct. 19, 1954

2,692,147

UNITED STATES PATENT OFFICE 2,692,147

ANTIJACKKNIFE ATTACHMENT FOR SEMITRAILER TRUCKS

Asa F. Whitney, Fort Wayne, Ind.

Application March 22, 1951, Serial No. 216,938

6 Claims. (Cl. 280—432)

This invention relates to improvements in an attachment for semi-trailer trucks adapted to prevent "jack-knifing" by excessive relative turning between a tractor and a trailer that is supported on the tractor.

It frequently occurs in maneuvering semi-trailer trucks on highways, especially when backing the vehicle down grade to avoid contact with opposing traffic, that the trailer is moved so as to extend relative to the tractor at two great an angle for convenience of the driver in maneuvering the vehicle, and thus causing the tractor and trailer to become "jack-knifed" or upset.

An object of the instant invention is to provide an attachment applicable to a semi-trailer truck by which relative turning movement of the trailer body and the tractor is limited during normal travel of the vehicle on the highways, and which may be readily thrown out of action to permit maneuvering of the tractor and trailer into required positions for loading and unloading or uncoupling purposes.

Another object of the invention is to construct the device in such manner so it may readily be installed on the truck without disturbance or interference with other equipment thereon.

And a still further object of the invention is to construct the device and install it on the vehicle so that it is easily accessible for operation.

Other objects and advantages of the invention appear in the following description.

Figure 1:
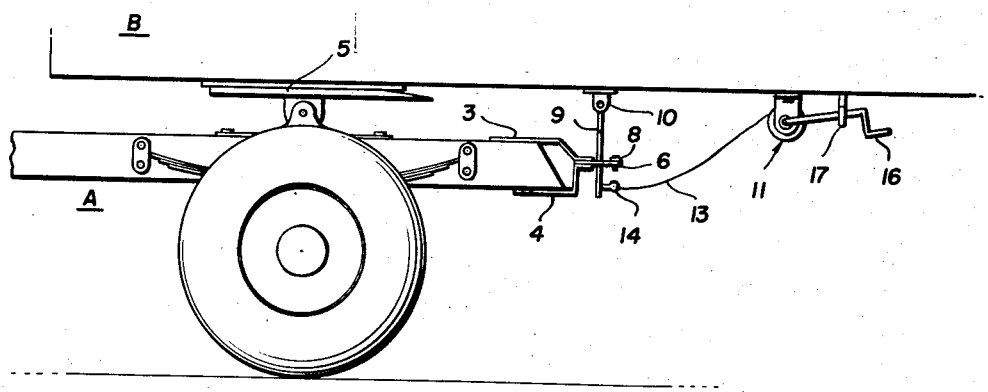
Figure 2:
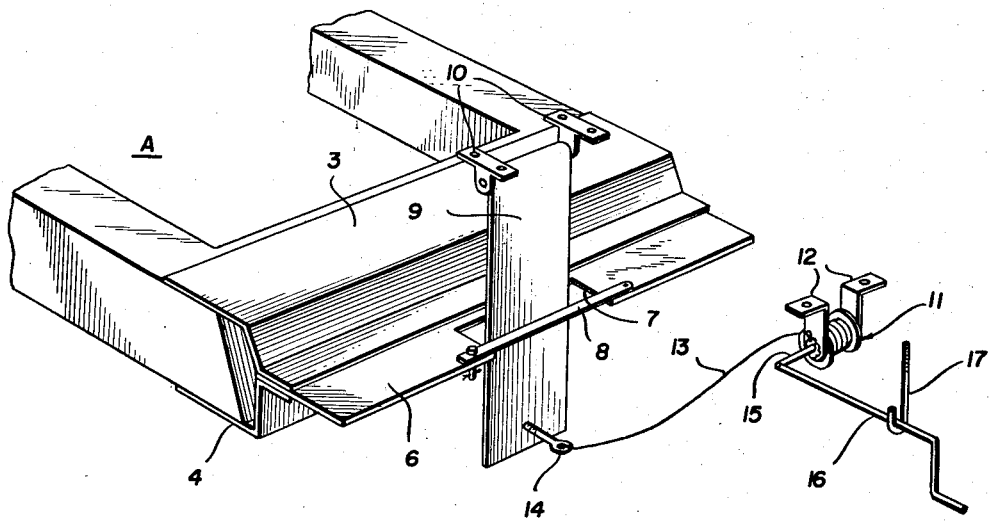

An illustrative embodiment of the invention is shown in the accompanying drawing, in which:

Fig. 1 is a fragmentary side elevational view of a semi-trailer truck showing a device incorporating the invention attached in operating position thereon; and Fig. 2 is a fragmentary perspective view showing the various parts of the device arranged relatively in their respective operating positions.

The illustrative embodiment of the invention consists of supporting plates 3 and 4 that are attached to the tail end of the tractor frame, indicated generally by A, upon which the fore end of the trailer body, indicated generally by B, is supported, there being a fifth wheel 5 intervening between the tractor frame and trailer body as in the usual manner.

A tail-plate 6, having an elongated recess 7 in its rearwardly extending portion, is secured between and supported by the plates 3 and 4, and there is removably secured on the rear portion of the tail-plate 6 a bar 8 hereinafter referred to for closing the recess 7.

A hinge-plate 9 is supported in connection with the bottom of the trailer body B by means of brackets 10 so the hinge-plate 9 has forward and backward swinging movement and when in operating position extends loosely through the elongated recess 7 in the tail-plate in which it has limited lateral movement, and is confined therein by the bar 8. A windlass 11 is mounted in connection with the bottom of the trailer body B by means of hangers 12, and the windlass has wound thereon a cable 13 that is connected with the hinge-plate 9 by a bolt 14 that extends from the rear face of the hinge-plate. The shaft 15 of the windlass has hinged thereto an operating crank 16 that is adapted to be swung into alinement with the windlass shaft 15 to permit operation of the windlass by turning the crank, which is supported when not in use, by a hook 17 that depends from the trailer body B.

In use, while the vehicle is traveling on a highway, the hinge-plate 9 is disposed in the recess 7 in the tail-plate in which it has lateral play to an extent limited by the length of the recess which permits relative turning movement on the fifth wheel between the tractor and the trailer body B, which is sufficient as to permit travel of the vehicle on the highway as in passing around obstructing traffic and movement out of the path of the opposing traffic. The extent of this deviation is predetermined more or less by varying the width of the hinge-plate 9 and the length of the recess 7 on the trail-plate which accordingly permits more or less lateral movement of the hinge-plate in the recess. In this manner is obviated excessive relative turning movement between the tractor frame and trailer body that ordinarily is the cause of "jack-knifing" as between the tractor and the trailer.

When it is desired to uncouple the tractor and trailer or to maneuver the vehicle in such manner as to require greater angularity between the tractor and trailer in positions necessary for loading or unloading the trailer the bar 8 is first removed from the trail-plate, after which, by manipulating the crank, the windlass is operated, causing the hinge-plate 9 to be swung out of the recess clear of the tail plate thus permitting turning movement of the trailer body relative to the tractor frame without restraint.

Variations from the particular construction above disclosed may be restored to by the exercise of skill in the art, without departure from the spirit or scope of the invention.

What I claim is:

1. A device for a semi-trailer to prevent "jack-knifing" thereof said device comprising supporting plates on the rear end of the tractor frame upon which the trailer body is pivotally supported, a tail-plate secured to said plates provided in its rear portion with a transversely elongated recess, a hinge-plate supported in connection with the trailer body, which hinge-plate when in operating position extends loosely through said recess in which it has limited lateral movement, thus to prevent excessive relative turning movement with respect to the tractor frame and trailer body of said semi-trailer, a bar removably secured on the tail-plate to close said recess, thus to confine the hinge-plate therein, and means operatively connected with the hinge-plate for moving it out of action.

2. A device for a semi-trailer to prevent the tractor frame and trailer body thereof from "jack-knifing," said device comprising a tail-plate secured transversely on the rear end of the tractor frame, provided in its rear margin with an elongated recess, a hinge-plate supported in connection with the trailer body arranged for forward and backward swinging movement and normally extending loosely through said recess in which it has limited lateral movement, thus to prevent excessive relative turning movement of said trailer body on the tractor frame, a bar removably secured on the tail-plate to close said recess and confine the hinge-plate therein, and means operatively connected with the hinge-plate for moving it out of action.

3. An anti "jack-knifing" attachment for a semi-trailer, comprising a tail-plate secured transversely on the tractor-frame of said semi-trailer, provided with an elongated recess, a hinge-plate secured on the trailer body of said semi-trailer for swinging movement, normally extending loosely through said recess and having limited lateral play therein, thus to prevent excessive turning as between said tractor frame and trailer body, a bar pivotably secured on the tail-plate to close said recess and confine said hinge-plate therein, and means supported on said semi-trailer engaging said hinge-plate for swinging the hinge-plate out of action.

4. An attachment for a semi-trailer for preventing the tractor frame and trailer body of said semi-trailer from "jack-knifing," said attachment including a recessed tail-plate secured on said tractor frame, and a hinge-plate carried by said trailer body having swinging movement, normally extending loosely into the recess of said tail-plate whereby limited lateral play between said tail-plate and said hinge-plate is made possible to provide corresponding limited turning movement between the tractor frame and trailer body, and a member pivotally associated with the tail-plate for closing said recess and for preventing said hinge-plate from withdrawing from said recess.

5. A device for a tractor-trailer vehicle comprising a tail member secured to a rear portion of a tractor which is stationary with respect to the tractor frame, a recess in said tail member and having a dimension extending in a direction transverse to said tractor frame, a hinge element mounted on said trailer against movement transversely of said trailer but for pivotal movement longitudinally thereof, said element being swingable into and out of co-operative engagement with said recess but having lateral clearance therewith whereby the tractor and trailer can have a limited swinging movement relative to each other, first means operatively associated with said tail member and operable to open and close selectively said recess, said first means when closed serving to confine said element in said recess, and means operatively connected with said element for moving it out of confining engagement with said recess.

6. A device for preventing jack-knifing of two pivotally connected vehicles having frames, comprising a tail member secured to the frame of one vehicle, a recess provided in said member, an element hinged on the other vehicle and being swingable into co-operative engagement with said recess, the connection between said element and said other vehicle, and the operative engagement between said element and said recess being such as to allow only a limited pivotal movement of the two vehicles with respect to each other, first means operatively associated with said tail member and operable to open and close selectively said recess, said first means when closed serving to confine said element in said recess, and means carried by said one of the vehicles for withdrawing said element from co-operative engagement with said recess whereby said vehicles may have unlimited pivotal action therebetween.

References Cited in the file of this patent

UNITED STATES PATENTS

| Number | Name | Date |
| --- | --- | --- |
| 2,194,160 | Brewster | Mar. 19, 1940 |
| 2,400,738 | Brown | May 21, 1946 |
| 2,495,943 | Peterson | Jan. 31, 1950 |